Patented Feb. 9, 1937

2,070,331

UNITED STATES PATENT OFFICE 2,070,331

PLASTIC MATERIAL AND METHOD OF MAKING

Elmer R. Derby, Springfield, and Gustavus J. Esselen, Swampscott, Mass., assignors to The Fiberloid Corporation, Indian Orchard, Mass., a corporation of Massachusetts No Drawing. Application February 1, 1936, Serial No. 61,940

1 Claim. (Cl. 106—22)

Our invention relates to plastic material, particularly to transparent sheet material which may be exposed to use at low temperatures. A particular application is for use in the manufacture of safety glass such as is used in automobiles and the like. As is known to those familiar with such materials, plastic sheets made of cellulose nitrate and cellulose acetate and other similar materials which are used for the purpose at present, while being satisfactory and having the requisite resistance to breaking at moderate and high temperatures, lose these properties to a marked degree at low temperatures, and become relatively weak and brittle at temperatures around 0° F., while at still lower temperatures they are not at all effective for the purpose intended. It has been found that certain synthetic resins, particularly certain acetal types, are less affected by low temperatures (i. e. those about 0° F. or below) but even these resins do not have the qualities of toughness and strength which are required, unless modified by suitable plasticizers.

Our present invention, therefore, has for its object, a transparent plastic material capable of use for these and other purposes which shall retain its toughness and strength at 0° F. or below, and which shall have the requisite color, clarity and stability. The invention is based on the discovery that di-esters of di-ethylene glycol and especially di-ethylene glycol di-propionate have the power of blending with synthetic resins of the acetal type in which an aldehyde is combined with polyvinyl alcohol and in which there may also be present in polymerized form certain amounts of the vinyl compound from which the polyvinyl alcohol was made; as well as certain amounts of uncombined polyvinyl alcohol and that, when so blended, the resulting product is clear and retains its strength and toughness at 0° F. and below to a remarkable degree.

Tests made on laminated glass sheets (12 inches x 12 inches) made with sheet plastic 0.025" thick embodying our invention, show that such glass is not fractured at 0° F. under the impact of a steel ball weighing two pounds and falling from a height of 15 feet, while similar glass made with cellulose acetate plastic of the best quality and of the same thickness is fractured by a fall of 2½ feet or less, and usually not over 2 feet at the same temperature.

The base material from which our novel plastic is preferably made is a resin which is made by hydrolyzing polyvinyl acetate to about 96% and combining all but about 8% of the resulting hydroxyl groups with formaldehyde. To this is added a di-ester of di-ethylene glycol, preferably di-ethylene glycol di-propionate, in amounts depending upon the physical properties required of the plastic. In practice we prefer to employ 60 parts of the di-ester to each 100 parts of the resin. While we prefer to use the propionate since it has the very remarkable effects described on the final product, we believe that other di-esters of di-ethylene glycol may be used effectively, for instance, di-esters of saturated aliphatic fatty acids such as acetic acid, butyric acid, and valeric acid, and also of certain saturated aromatic fatty acids such as benzoic acid, and of some unsaturated acids such as maleic.

Believing ourselves to be the first to discover the beneficial effects of the di-esters of di-ethylene glycol on the physical properties of the polyvinly resins of the character described, we intend to claim our invention as broadly as possible.

We claim:

The improved plastic material having great strength and toughness at low temperatures and the like which comprises a resin made by hydrolyzing polyvinyl acetate to about 96% and combining all but about 8% of the hydroxyl groups with formaldehyde, to which product has been added about 60 parts of di-ethylene glycol di-propionate to each 100 parts of the resin.

ELMER R. DERBY.
GUSTAVUS J. ESSELEN.